April 11, 1967 J. GRAVES 3,313,271
POULTRY CAGE SYSTEM WITH BIRD RETAINER AND
BOTTOM SUPPORTING MEANS
Filed Oct. 21, 1965 2 Sheets-Sheet 1

INVENTOR.
JEWEL GRAVES
BY
ATTORNEYS

INVENTOR.
JEWEL GRAVES

United States Patent Office 3,313,271
Patented Apr. 11, 1967

3,313,271
POULTRY CAGE SYSTEM WITH BIRD RETAINER AND BOTTOM SUPPORTING MEANS
Jewel Graves, Holland, Mich., assignor to Big Dutchman, Inc., Zeeland, Mich., a corporation of Michigan
Filed Oct. 21, 1965, Ser. No. 499,915
5 Claims. (Cl. 119—48)

This invention relates to poultry cage row systems having means for automatically collecting eggs, and more particularly to such systems wherein means are provided to prevent the birds enclosed within the cages, particularly dead birds, from interfering with the automatic collection of eggs.

Many of the more modern poultry farms have poultry enclosure systems embodying means for automatically collecting eggs. The collection is generally accomplished through the use of elongated cage rows, divided by partitions into discrete cages. The floors of these cage rows are slanted and an egg exit is provided along the side of the cage row adjacent the lower end of the cage row floor. The eggs roll out of the cages and onto an adjacent conveyor belt which carries them to a central processing facility.

In order to prevent the eggs from catching in the corners of the individual cages it is necessary that the egg exit have a length approximately equal to the length of the cage.

This exit must be substantially free from obstructions in order that the eggs may freely roll onto the adjacent conveyor belt.

When these systems were first used it was found that the chickens in the cages would ruin a large percentage of the eggs passing by on the adjacent conveyor belt by pecking at the shells. This problem was solved through the provision of a relatively impervious egg guard which was affixed to the segment of the cage wall adjacent the egg exit. One such egg guard is shown in copending application Serial No. 392,437, filed August 27, 1964, now Patent No. 3,265,207, and assigned to the same assignee as the present application. While egg guards of this type have substantially alleviated the problem of pecking at the eggs on the conveyor line, the system still does not operate in a completely satisfactory manner.

The required length of the egg exit has necessitated a similar length of unsupported floor structure along one side of each individual cage. Because of the weight of the chickens and the relatively light gauge of the wire mesh used in fabrication of the cages, the floors of the cage section tend to sag somewhat between partitions. This sagging can result in the egg exits dropping out of alignment with the egg conveyor belt at the midsection between partitions. If the conveyor belt is lowered to compensate for this sag, eggs rolling out of the egg exits adjacent the partitions drop onto the conveyor belt through a distance which is often sufficient to break them.

Another, and perhaps more important, problem arises from the fact that when the fowl contained in the enclosure die, the dead body tends to be forced out towards the egg conveyor belt by gravity and by the other chickens caged in that particular section. While the clearance between the egg guard and the bottom of the cage is normally insufficient to allow the entire bird to pass onto the conveyor belt, the dead fowl's legs or wings protrude out of the cage and onto the egg conveyor belt. This causes the eggs to back up at that particular point on the conveyor belt and often results in eggs being forced off of the belt and broken, if the situation is not corrected quickly. Since the overall purpose of these types of poultry cage systems is to render as automatic as possible the entire feeding and watering processes and complete collection and processing of the eggs, and since this potential problem might only occasionally occur but requires sharp constant surveillance to prevent it when using present equipment, any structural improvement curing this defect and thereby permitting a lesser degree of human surveillance represents a marked contribution to the art.

It is an object of this invention to provide a poultry cage system embodying means which, though simple and inexpensive, are very effective to prevent the sagging of the cage floor at the egg roll out areas between partitions.

It is another object of this invention to provide a poultry cage system embodying means which, simple and inexpensive, are effective to prevent limbs of dead or dying birds from interfering with the progress of the eggs on the centralized collection conveyor belt.

More particularly, it is an object of this invention to provide means whereby the cage bottom may be effectively supported and whereby the inside of the cage may be effectively isolated from the egg conveyor belt without interfering with the exit of the eggs from the cage onto the collection belt.

These and other objects of this invention will be clearly understood by reference to the accompanying specification and figures in which.

Briefly, these and other objects of this invention are accomplished through the provision of a plurality of special retainer clips having a crank-shaped portion at one extremity thereof and a hooked-shaped portion at the other extremity. The crank-shaped portions of the clips are passed through and secured to holes provided in the egg guard. The hook ends of the retainer clips are then secured to the floor of the cage. The spacing between the retainer clips is sufficiently small that the body of a bird is completely retained in the cage so that the wings or legs cannot pass through the openings therebetween sufficiently to interfere with the passing eggs. Such spacing is also sufficient to transmit load stresses to the frame, preventing sagging of the cage bottom.

Figure 1:
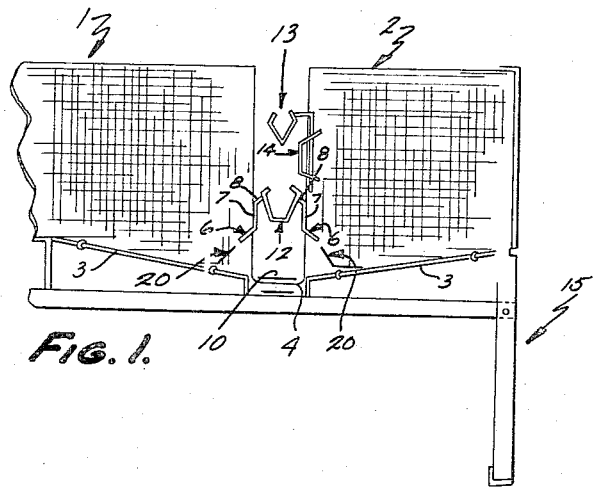
FIG. 1 is an end view of a poultry cage system embodying the principles of this invention.

Referring now specifically to the figures, FIG. 1 shows a pair of facing cage rows 1 and 2, each composed of a plurality of cages side by side, having slanted bottoms 3 and a conveyor belt support 4. The cage rows are supported above the floor by means of a support assembly 15. The cage rows are of considerable length and, as shown in FIG. 2, are divided into individual cages or sections by means of partitions 16.

Figure 3:
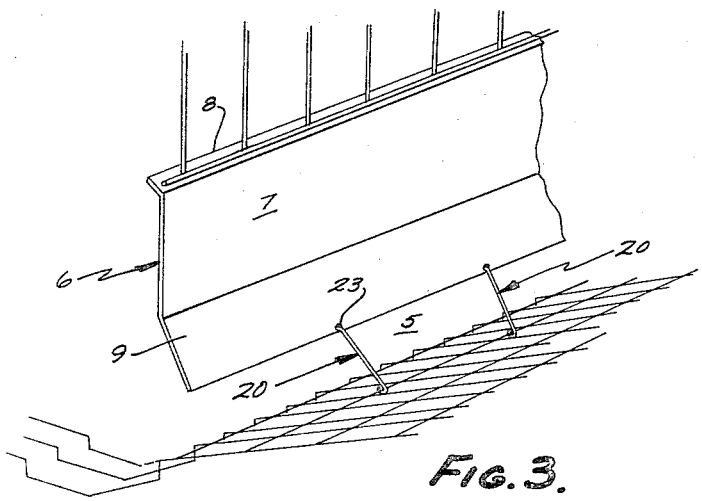
FIG. 3 is a broken perspective view showing a manner in which the bird retainer and bottom supporting means which is the subject of this invention is attached to the cage.
Figure 2:
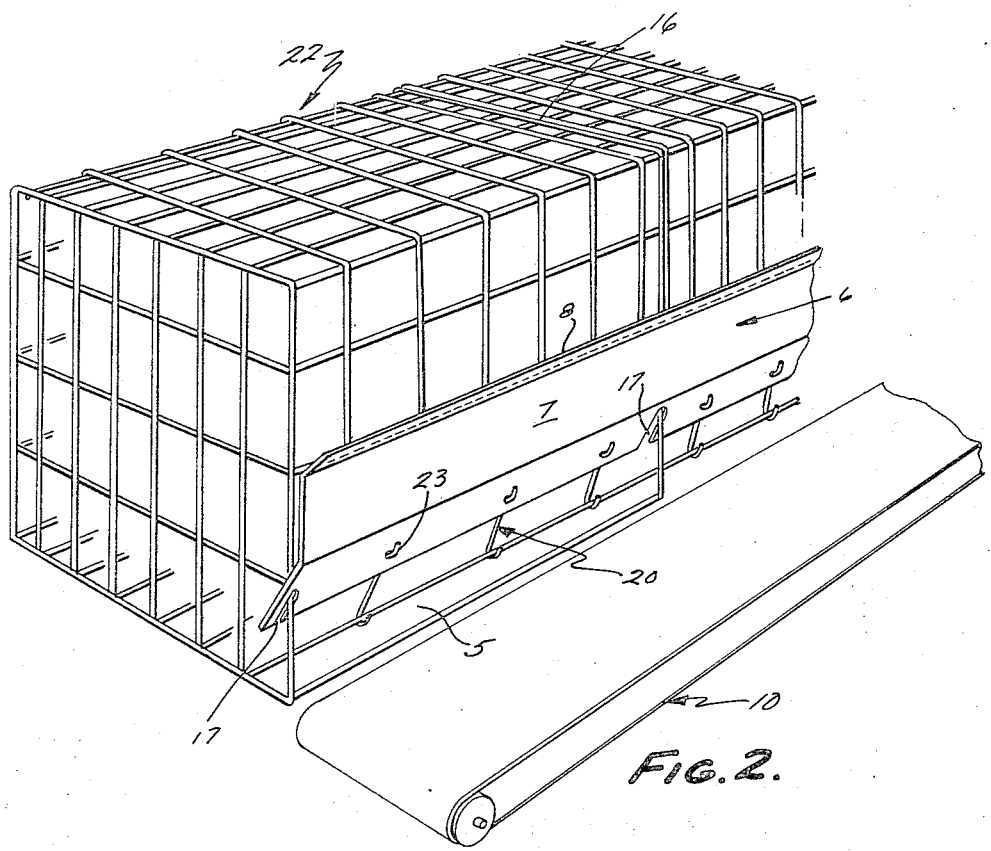
FIG. 2 is a perspective view showing one elongated cage and the partitions which divide it into sections.

As seen best in FIGS. 2 and 3 an egg exit 5 runs the length of each cage adjacent conveyor belt 10. The egg exit 5 is bounded at its upper extremity by an egg guard 6. Conveniently, when the mesh is formed into the cage an opening of sufficient dimensions to accommodate both the egg guard and the egg exit may be left. The egg guard may then be affixed to the upper mesh boundary of the opening in any well-known manner. The egg guard 6 is composed of a vertical mid-section 7, an outwardly and upwardly extending lip 8 and a downwardly and inwardly extending flange 9. The purpose of the egg guard 6 is to prevent the birds contained within the cages from pecking at the eggs as they go by on the conveyor belt. As seen in FIG. 2, the egg guard for an entire elongated cage is formed from one stamping of sheet metal. A plurality of partition slots 17 are formed during the fabrication in such a manner that the partitions 16 separating the cage sections are received thereby. Sufficient space is left between the egg guard and the bottom of the cage to form an egg roll-out opening to permit passage of eggs onto the conveyor belt.

Elongated feed trough 12 and water trough 13 are attached between the cage rows in any convenient manner. These troughs run the entire length of the elongated cage rows and communicate with supply means (not shown) to automatically constantly supply the birds in all the cages, in conventional manner. Conveniently, the feed trough 12 is shaped in such a manner that it rests upon the outwardly and upwardly extending lips 8 of egg guards 6 as shown in FIG. 1. Of course, the water trough could be similarly situated. As shown in FIG. 1, however, the water trough is held in place by water trough supports 14.

It will be noted from an examination of FIGS. 2 and 3 that the cage bottom is relatively unsupported along the extent of the egg exit between partitions 16. As previously pointed out, in past embodiments of automatic poultry cages there has occurred a tendency to sag along these sections. This tendency is alleviated in the present invention by providing a retainer clip 20.

Figure 4:
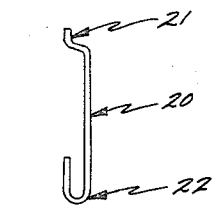
FIG. 4 is an elevational view of the bird retainer and bottom supporting means.

As shown best in FIG. 4, the retainer clip is fabricated from semi-rigid wire so as to form a crank-shaped portion 21 and a hook-shaped portion 22 at opposite extremities. The crank-shaped portion 21 is passed through a receiving aperture 23 provided in the egg guard and the hook-shaped portion is affixed to the mesh bottom of the cage. A sufficient number of retainer clips are provided between each partition to effectively prevent sagging of the cage bottom.

The retainer clips also serve to prevent the legs and wings of dead or dying birds from jutting out of the cage section onto the egg conveyor belt and thus impeding the travel of eggs to the processing point. The number of clips required between partitions for effective isolation of the conveyor belt depends, of course, upon the size of the chickens and the size of the eggs. It has been found that in a twenty-four inch section four such retainer clips spaced at equal intervals along the length of each egg exit are sufficient for this purpose. Such a number also provides sufficient support to prevent sagging of the cage bottom.

Thus it will be seen that this invention provides means which are both simple and inexpensive and, yet, effective to prevent sagging of the cage bottom and the protrusion of wings and legs of dead birds onto the egg conveyor belt. These objects are accomplished without utilizing wide structural members which might impede the traverse of the eggs from the cage onto the conveyor belt. Thus when an egg rolls down the cage bottom and happens to strike a retainer clip 20 it will merely be diverted to one side or the other but will not be held in the cage.

While a preferred embodiment has been illustrated it will be apparent that many modifications may be effected without departing from the spirit and scope of this invention. Such of these modified embodiments as incorporate the principles of the invention are to be considered as included in the hereinafter appended claims unless these claims by their language expressely state otherwise.

I claim:

1. A poultry enclosure comprising:
an elongated wire mesh cage having a slanted bottom and an opening in the wall adjacent the lower side of said bottom, said opening being substantially rectangular in shape and extending substantially the entire length of said cage;
egg conveyor belt means adjacent said opening;
an egg guard of substantially the same length as said opening affixed to the upper mesh boundary of said opening, said egg guard extending downwardly and into said cage, the lower edge of said egg guard terminating a sufficient distance from said bottom to allow eggs to pass therebetween; and
a plurality of dead bird-retaining, spaced, tensile, wire clips connected on their upper ends to a lower portion of said egg guard and on their lower ends to said cage bottom intermediate the sides of said cage.

2. A poultry cage enclosure comprising:
a mesh cage having a slanted bottom and an opening in the wall adjacent the lower side of said bottom, said opening being substantially rectangular in shape and extending substantially the entire length of said cage;
a conveyor belt adjacent said opening;
an egg guard of substantially the same length as said opening affixed to the upper mesh boundary of said opening, said egg guard extending downwardly and into said cage, the lower edge of said egg guard terminating a sufficient distance from said bottom to allow eggs to pass therebetween; and
bird retainer, bottom supporting means extending between said egg guard and said bottom, said means having a crank-shaped portion at one extremity thereof which is received and secured by an aperture in the egg guard and having a hook-like portion at the other extremity which engages the mesh bottom of said cage.

3. A poultry enclosure comprising:
an elongated wire mesh cage row having a plurality of partitions dividing it into cage sections, said cage row having a plurality of cut away portions along the bottom of one side between partitions, said cut away portions being substantially rectangular in shape and extending substantially the entire distance between partitions;
a plurality of egg guards of substantially the same length as said cut away portions, affixed to the upper mesh boundary of said cut away portions, said egg guards being fabricated from said material and extending downward and into said cage, the lower edge of said egg guards terminating a sufficient distance from the floor of said cage to allow eggs to pass therebetween;
a plurality of bird retainer, floor supporting means extending between each said egg guard and the floor portion of the cage adjacent thereto, said bird retainer, floor supporting means having a crank at one extremity thereof which is received and secured by an aperture in the egg guard and having a hook-like portion at the other extremity for engaging the mesh floor of the cage.

4. A poultry enclosure comprising:
an elongated wire mesh cage row having a slanted bottom and an opening in the wall adjacent the lower side of said bottom, said opening being substantially rectangular in shape and extending the entire length of said cage row;
egg conveyor belt means adjacent said opening;
a plurality of partitions dividing said cage row into individual cages;
an egg guard of substantially the same length as said opening affixed to the upper mesh boundary of said opening, said egg guard extending downwardly and into said cage row, the lower edge of said egg guard terminating a sufficient distance from said bottom to allow eggs to pass therebetween; and
bird retainer and bottom supporting means extending between said egg guard and said bottom, said means being relatively thin to allow eggs to roll thereby, said means having a crank-shaped portion at one extremity thereof which is received and secured by an aperture in the egg guard and having a hook-like portion at the other extremity which engages said bottom.

5. The combination as set forth in claim 4 wherein said egg guard has a plurality of slots spaced along its length for receiving the corners of said partitions.

References Cited by the Examiner
UNITED STATES PATENTS 2,694,381  11/1954  Keegebein _____ 119—48
2,756,721   7/1956  Hayes _____ 119—48
2,827,014   3/1958  Kaegebein _____ 119—48
3,119,375   1/1964  Ernst _____ 119—48
3,208,430   9/1965  Ernst _____ 119—18

SAMUEL KOREN, Primary Examiner.

ALDRICH F. MEDBERY, Examiner.

UNITED STATES PATENT OFFICE
CERTIFICATE OF CORRECTION

Patent No. 3,313,271                                                     April 11, 1967

Jewel Graves

It is certified that error appears in the above identified patent and that said Letters Patent are hereby corrected as shown below:

Column 1, line 39, "392,437" should read -- 392,537 --; line 40, "Patent No. 3,265,207" should read -- abandoned --.

Signed and sealed this 17th day of March 1970.

(SEAL)
Attest:

Edward M. Fletcher, Jr.                                WILLIAM E. SCHUYLER, JR.
Attesting Officer                                                    Commissioner of Patents